(12) United States Patent
Walters et al.

(10) Patent No.: US 7,324,996 B2
(45) Date of Patent: Jan. 29, 2008

(54) DIGITAL DATA TRANSFER AUTHORIZATION METHOD AND APPARATUS

(76) Inventors: David Antonio Walters, 1108 Broadview Rd., Ft. Washington, MD (US) 20744; Jonathan James J. Walters, 1108 Broadview Rd., Ft. Washington, MD (US) 20744; Denley Earl Walters, 1108 Broadview Rd., Ft. Washington, MD (US) 20744

( * ) Notice: Subject to any disclaimer, the term of this patent is extended or adjusted under 35 U.S.C. 154(b) by 478 days.

(21) Appl. No.: 11/039,150

(22) Filed: Jan. 19, 2005

(65) Prior Publication Data

US 2005/0198533 A1  Sep. 8, 2005

Related U.S. Application Data

(60) Provisional application No. 60/537,352, filed on Jan. 20, 2004.

(51) Int. Cl.
*G06F 7/00* (2006.01)

(52) U.S. Cl. .................. 707/9; 707/10; 707/6
(58) Field of Classification Search ............ 707/9
See application file for complete search history.

(56) References Cited

U.S. PATENT DOCUMENTS

| | | | |
|---|---|---|---|
| 6,854,009 B1* | 2/2005 | Hughes | 709/220 |
| 2001/0051996 A1* | 12/2001 | Cooper et al. | 709/217 |
| 2003/0023505 A1* | 1/2003 | Eglen et al. | 705/26 |
| 2003/0233547 A1* | 12/2003 | Gaston et al. | 713/168 |
| 2004/0148274 A1* | 7/2004 | Warnock et al. | 707/2 |
| 2006/0083153 A1* | 4/2006 | Pitoux et al. | 369/199 |

* cited by examiner

*Primary Examiner*—Wilson Lee
*Assistant Examiner*—Binh V Ho
(74) *Attorney, Agent, or Firm*—Denley Walters; Jonathan Walters; David Walters

(57) ABSTRACT

A method and/or apparatus for digital data delivery of hypermedia and/or datafiles including proprietary content. An operative of the method provides authorization of access a1). Remote authorization is provided a4), providing critical dissemination to a plurality of locations.

19 Claims, 1 Drawing Sheet

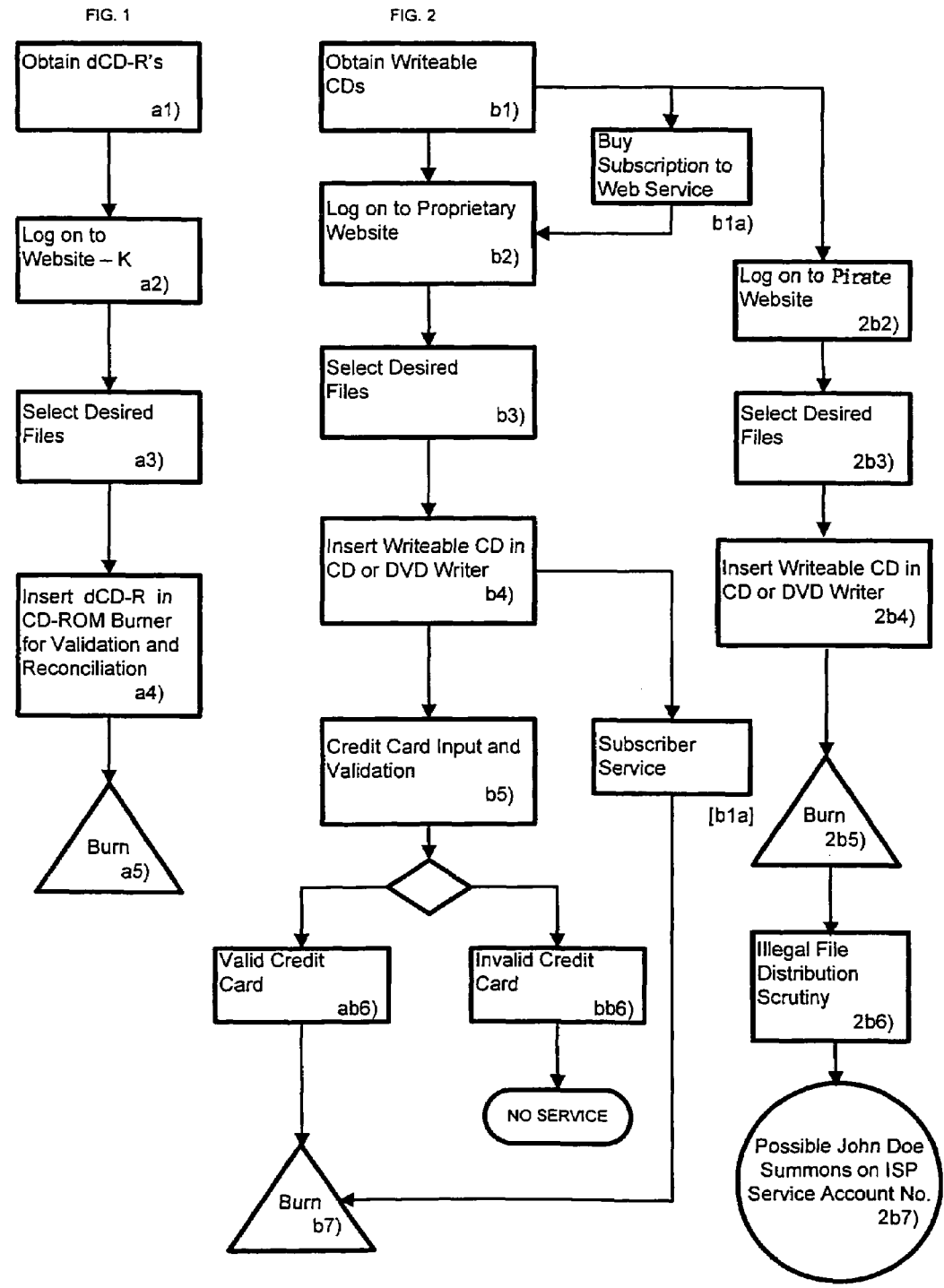

DIGITAL DATA TRANSFER AUTHORIZATION METHOD AND APPARATUS

CROSS REFERENCE TO RELATED APPLICATION

This application is entitled to the benefit of Provisional Patent Application Ser. No. 60/537,352, filed 2004, Jan. 20.

BACKGROUND OF THE INVENTION

1. Field of the Invention

This invention relates to datafile [music/movie] transferring and/or downloading. Downloading may involve hypertext transfer protocol (http) transmission via World Wide Web connection.

2. Discussion of Prior Art

FIG. 2 is a flowchart illustrating operations of prior art datafile distribution methods in the context necessary for the prior art discussion, of the present invention. This figure omits discussion of computer hardware and/or software unnecessary for this discussion, but it should be understood that additional components necessary for datafile transfers may be utilized. (i.e., modem, mouse, etc.).

Personal computers (CPU's), are adopting more entertainment duties as technology advances adapt more prolific applications. Consumers in recent years have begun employing the use of file compression formats such as—MP3, MPEG, JPEG, etc.—for the purpose of trading files, including music and/or movie (motion picture) files compressed in such a format, over the Internet (World Wide Web). Additionally, consumers utilize the commercial versions of CD-ROM/burners to 'write' and/or make compact discs containing a personal selection of music/movie files downloaded from the Internet, for replay on home computers or any variety of applications.

Blank compact disc storage media are widely available in a variety of retail venues, for purchase by the consumer b1). The three main types of optical storage media available are, (1) rewriteable, (2) write-once read-many (WORM), and (3) compact disc read only memory (CD-ROM). The optical disc makes use of laser technology: digital data are recorded by burning a series of microscopic holes, or pits, with a laser beam into thin metallic film on the surface of a 4¾-inch (12-centimeter) plastic disc.

(1) rewriteable optical discs allow the user to write, erase and rewrite information on the disc. (2) WORM type optical discs allow the user to write information on the disc in a permanent state. (3) CD-ROM type discs typically are obtained with information already written or stored on the disc. Information stored on the optical disc can be 'read' in a CD-ROM drive of a CPU or equivalent optical technology devices.

'Pirate' Downloading Website Services

File sharing networks, utilizing Peer-to-peer (P2P) technology, such as Napster, KaZaA and Morpheus were some of the first to facilitate this type of service, offering a wide variety of content including ranges of music and movies. Parloff, R. (2003, Oct. 27), The Real War over Piracy. *Fortune,* 148 (9), 148-156. The wide variety of files, especially music files was due to the unrestricted admission of data uploaded by users participating file sharing on the P2P network. Utilizing the so-called pirate website 2b2), a consumer shared or distributed datafiles of their choice 2b3), by up- or downloading datafiles. Downloaded files are stored on the hard drive of a CPU 2b4) and could be copied any number of times, including making unlimited numbers of illegally copied CD's. 2b5), on obtained compact disc storage media.

Consumers paid no fees to up- or download datafiles, including copyrighted proprietary material, (i.e., music, movies, etc.). The KaZaA system is reported to have attracted 4.5 million simultaneous users participating in file sharing, according to on-line media measurement group BigChampagne, *Fortune* 148 (9), at 152.

However the artists and/or owners of the copyrighted material were not being compensated and/or paid royalties for the dissemination of their intellectual property. Ninety percent of the files available via KaZaA, are copy-righted material, according to entertainment industry analysis 2b6). *Fortune* 148 (9), at p. 152. Lawsuits alleging copyright infringement led to the shut down of Napster in 2001. Roberts, J. L. (2003, Oct. 13) Business: Pay 2 Play, *Newsweek,* pp 47-48.

Lawsuits have also been filed against individual file sharers or music consumers identified only by their numeric Internet addresses 2b7). McBride, S., (2004, Mar. 24). RIAA Sues People at 21 Colleges, claiming Illegal Music Sharing. *The Wall Street Journal*, p. B4. File sharing over the Internet has greatly affected the music distribution industry.

Proprietary Downloading Website Services

Several music downloading sites have been developed and operated in compliance with copyright laws, providing compensation to music companies and/or artists. Websites such as iTunes Music Store (apple.com/iTunes), BuyMusic.com (buymusic.com), MusicMatch Downloads (musicmatch.com), collect fees for services including downloading. Wingfield, N., Smith, E., (2003, Oct. 9) New ways to pay 99 cents for Music, *The Wall Street Journal*, pp. D1, D2. Logging on to one of the proprietary websites b2), the music files available for personal selection by the consumer b3), is limited in comparison to that available from the 'pirate' websites. Limitations are incorporated into the music files limiting the number of times it may be copied either from CPU to CD b4) or CPU to CPU. At these websites, fees are mainly collected via credit card transactions over the internet b5). Questions have been raised about the profitability of this business model where the downloading websites have to pay royalties and credit card transaction fees while offering songs at a marketable price. Tam, P., (2003, Oct. 9) Apple's E-music Store Ins't the Next Beatles, *The Wall Street Journal,* pp. C1, C3.

The most versatile applications of datafile downloading websites are illegal or require a valid credit card transaction for participation ab6). Consumers with imperfect credit history, invalidating their credit cards for what ever reason cannot enjoy music downloads bb6). Several of the websites provide downloads to consumers who pay subscription fees subject to time and/or content quantity limitations, [b1a)] which allow payment by mail. In any event, music consumers, have to purchase blank CD storage mediums for music file storage b7), in addition to the required credit card for instant service, or endure the time issues involved with subscription payment.

Compared to KaZaA's 4.5 million simultaneous users, consumers have been less receptive to the legal versions of downloading websites for a number of reasons including having to pay for service. Consumer behavioral resistance is challenged by not facilitaing removeable storage mediums to store the downloaded files containing music/movie content. Music fan consumers often share their favorite artists' songs with other fans. Music is also a common gift purchase. The tangibility of removeable storage mediums facilitates the transferability of the music content within them, in accordance with existing consumer behavior. An MP3 file containing a song cannot be gift wrapped and given, unless a consumer spends between an average of $199.99-299, on a digital audio player. Mossberg, W. S., (2004, Feb. 11), Smaller iPod to hit stores next week. *The Wall Street Journal*, pp. D1, D4. Compact Discs containing popular music are often Christmas, Valentine's Day and Birthday gifts. MP3 files lack the tangible properties a CD provides for gift presentation of a cherished song or artist. One can compare receiving a handwritten letter, to an e-mail from a love interest. The physical letter has a more personal effect.

Consideration should also be given to the premium required to purchase hardware and/or devices able to play songs in MP3 or comparable file compression formats. With digital download services in its nascent state, introductory pricing on hardware and/or devices are high compared to CD or other physical storage medium formats.

Napster has been relaunched by Roxio Inc., now in compliance with copyright laws. The Napster Website includes a service that will allow 15 song downloads from the website to consumers who purchase prepaid cards in retail stores. Wingfield, N., (2003, Oct. 28), Quickfix, Music Allowance. *The Wall Street Journal*, p. D1. With MP3.com's Beam-It, MP3.com software recognizes an original CD in a consumer's ROM Drive and registers it. Subsequently the consumer can listen to a an MP3 version of the songs on the original CD, drawn from a database of 45,000 CD's that MP3.com copied (without license), from any computer. MP3.com also offered Instant Listening, which allows a consumer to immediately start listening to an MP3 version of a CD purchased online, before the disc is physically delivered. Pohlmann, K. C., (2000, June) Digital Horizons: Sue City. *Stereo Review's Sound & Vision*, p. 34. Beam It requires the consumer to purchase a pre-recorded CD, in order to utilize the advantages of the MP3 file compression format. The convenience and versatility of Internet music downloads is severely limited in this procedure. Consumers cannot lawfully create a CD compiled of a personal selection of music. Instant Listening requires the use of a credit card transaction, not to mention that, the consumer must wait before the disc is physically delivered. Also this version of software was the subject of copyright infringement litigation between Recording Industry Association of America (RIAA) vs. MP3.com. *Stereo Review's Sound & Vision*, ibid.

Objects and Advantages

This invention provides [music/movie] datafile downloads to paying consumers. When the objects of the invention are performed in combination the effectiveness of proprietary datafile downloads will likely be enhanced.

A wide variety of music choices will be provided by allowing consumers, unrestricted uploads of files, at no cost, meanwhile generating revenue and paying royalties to the music companies and/or owner's for distribution of their copyrighted material. (User and/or consumer uploads will not be the only source of files available for distribution by the website of the present invention.)

Extension of proprietary [music/movie] datafile downloading service to a wider consumer base is also enabled when the present invention is used. Many consumers may not want to, or are unable to utilize credit cards to make transactions over the Internet. Parents of an underage music fan, can utilize the present invention to provide legal datafile downloads, without having to make credit card transactions. This objective is achieved by providing a point of sale which facilitates cash payment for service. Including at brick and mortar retail stores.

A novel point of sale of access to datafile downloads is provided. Said access to downloads, is conveniently integrated with a removeable storage medium. This invention provides proprietary content datafile downloads in full compliance with copyright law, while providing access to the Internet proprietary content downloads without having to pass credit checks.

Also, the music/movie content is organized by default when the consumer utilizes a removeable storage medium format such as a physical CD. An enormous amount of MP3 files can be stored in a single device. But still, to organize all the information is a task in and of itself. Further objects and advantages of our invention will become apparent from a consideration of the drawings and ensuing description.

SUMMARY

The invention is a system comprising a website (Website-K); Website-K provides access to an archive of datafiles containing a wide variety of content including proprietary material; A multitude of removable storage mediums (dCD-R's), each of which incorporate encoding authorizing access to a predetermined amount of exclusive datafile downloads via the Internet from Website-K. The downloaded datafiles can then be stored on the dedicated removable storage medium, dCD-R. In practice, Website-K and the dCD-R storage mediums, have a 'lock' and 'key(s)' relationship, providing exclusive access to downloads for storage on the storage medium, with each storage medium enabling authorization to a predetermined amount of datafile downloads.

DRAWINGS

FIG. 1 is a flowchart of a method of datafile distribution according to one embodiment of the invention. It should be noted that in some embodiments, various of the steps may occur concurrently, in a different order than shown, or may be ommitted. Furthermore, one or more additional steps may be performed as desired.

FIG. 2 is a flowchart for comparative purposes of prior art datafile distribution methods and services. Including proprietary websites collecting fees, and so-called 'pirate' websites which have been classified as such for non-compliance with copyright law. It should be noted that in various versions of download services steps may occur concurrently, or in a different order.

DRAWINGS

List of Reference Numerals FIG. 1 a1) a consumer obtains a dCD-R in optical disc application, that has authorization encoding for a predetermined amount of datafile downloads.

a2) utilizing a CPU the consumer logs on to Website-K via Internet (World Wide Web) connection. Website-K provides access to an archive of datafiles which contents include proprietary material, i.e. music/movie.

a3) the consumer selects desired files of those available via Website-K.

a4) the consumer inserts dCD-R in CD-ROM drive, where Website-K employs validation of dCD-R. Validation includes verification of dCD-R's and accounting/reconciliation of predetermined amount of datafile downloads used per allowances allotted each dCD-R.

a5) per verification of valid dCD-R, Website-K allows download of the selected datafiles for storage on dCD-R.

List of Reference Numerals FIG. 2 b1) a consumer obtains blank CD-R/DVD-R (writeable compact disc/digital video disc format.)

b2) the consumer log-on to proprietary website providing access to proprietary material in compliance with copyright laws.

b3) the consumer selects desired files.

b4) the writeable CD/DVD is inserted in the CD-ROM/Burner by the consumer.

b5) credit card information input by the consumer.

ab6) valid credit card in good standing.

bb6) invalid credit card, results in denial of service.

b7) allowance of datafile downloads which can be transferred to writeable CD/DVD.

[b1a)] the consumer can purchase a subscription for website service which will allow datafile downloads subject to content and/or time limitations which may omit b5), ab6), bb6).

2b2) the consumer log-on to 'pirate' website no restrictions on datafile content without regard to compliance with copyright regulations.

2b3) the consumer selects desired files

2b4) the writeable CD/DVD is inserted in the CD-ROM/Burner by the consumer.

2b5) the datafiles are downloaded to the CPU, where the datafiles can be copied an unlimited amount of times including to writeable CD's/DVD's.

2b6) datafile downloads are subjected to illegal file distribution scrutiny for violations of copyright law.

2b7) possible John Doe summons on Internet Service Provider (ISP) service account no. to federal court for copyright infringement lawsuit.

DETAILED DESCRIPTION

Preferred Embodiment

The present invention now will be described more fully hereinafter with reference to the accompanying figures, in which an illustrative embodiment of the process of the invention is shown. The invention may, however, be embodied in many different forms and should not be construed as limited to the embodiments set forth herein; rather, these embodiments are provided so that this disclosure will be thorough and complete, and will fully convey the scope of the invention to those skilled in the art. FIG. 1 is a flowchart illustrating operations for a datafile download distribution method according to the embodiments of the present invention. Like numbers refer to like elements throughout.

Website-K a2)

A hypertext document and/or documents, incorporating Hypertext Markup Language (HTML). Website-K will be assigned an online address or Uniform Resource Locator (URL) on the Internet via World Wide Web connection. As a client/server system utilizing hypertext transfer protocol (http), further elements include:

Server(s) providing access to a file server containing hypertext and/or hypermedia files. Said files having corresponding hyperlinks facilitating accessing and/or locating desired files. Also including 'keyword search' capability. The file server retrieves selected files from a digital data 'archive'. An additional server duty is evaluation of a security protocol transmitted from client/user station prior to allowing download of hypermedia files (music, movie, etc.). The security protocol includes verification of a serial number (i.e., check sum or check digit verification), and accounting/reconciliation of predetermined downloads allowed.

Client interaction with user, providing input of user commands implementing personal selection of files (browsing) in the archive. Client displays results of file searches by file server. Also including transmission of serial data read from dCD-R in a CD-ROM/Burner drive to server for verifying valid dCD-R prior allowance of downloading hypermedia files in a compressed format (MP3, MPEG, JPEG), including files containing proprietary material (movie, music, etc.). Client also facilitates upload of datafiles, to the server.

dCD-R's a1)

A dCD-R denotes, in singularity, one of a multitude of dedicated storage mediums. In the preferred embodiment, an optical disc storage medium format is a dCD-R application. The optical disc storage medium format includes compact disc (CD) and digital video disc (DVD). As a dCD-R application, a multitude of optical disc storage mediums are used as 'dedicated storage mediums', thus each of which providing access to a predetermined amount of exclusive datafile downloads. Allowing transfer of datafiles to optical disc (dCD-R), for storage and "replay".

In the dCD-R application, optical discs are of the type which allows a user to write information on each disc only once, with subsequent erasure impossible; (WORM, write once read many, i.e. CD-R, DVD-R).

Further included in the dCD-R optical disc application, each of the dCD-R discs incorporate a designated serial number which can be read via interface with a CD-ROM/Burner drive, for transmission to Website-K. The serial number also comprises security measures for verifying whether a dCD-R is valid. (i.e., check sum or check digit verification of said serial number). Various subroutines, in programming language (C++, BASIC, etc.), which generate serial numbers, and provide check sum or check digit verification are available as shareware. Said subroutine is then incorporated as described within the prefferred embodiment presented. Such subroutines are available as 'shareware' on the Internet, and can be obtained via websearch on sites such as Google.com.

Operation of the Invention

Consumers generally obtain blank storage media, from brick and mortar retail stores. Utilizing the downloading system and method presented within, when the consumer purchases the dCD-R storage medium, access to legal proprietary datafile downloads is simultaneously obtained. Thus, a novel point of sale of datafile downloads is provided to the consumer. It is also convenient to obtain the storage medium, and datafile download authorization simultaneously. Point of sale, refers to the manner and place in which a good is retailed.

To utilize the proprietary download system and method of the present invention, a consumer obtains a dCD-R a1). The dCD-R of a1) is used to denote one of a multitude of storage mediums, each of which incorporate serial encoding (numeric). The serial encoding is verifiable via digital data transmission. Said encoding is also used to authorize a predetermined amount of datafile downloads, from Website-K. Preferred dCD-R storage mediums are a multitude of optical discs including compact disc; (CD-R format) and digital video disc (DVD-R format).

The consumer must then log-on to Website-K a2), via Internet (World Wide Web) connection utilizing a computer processor device. The computer processor device includes a CD-ROM/Burner drive in the preferred embodiment. The CD-ROM/Burner drive provides 'read', as well as 'write' capability of optical discs.

Website-K provides access to an archive of datafiles, and facilitates personal selection of said datafiles a3). At the consumer interface location, the dCD-R is validated in the CD-ROM/Burner drive a4). Upon verification, Website-K allows access to exclusive datafile downloads, subject to the amount each dCD-R is allotted to authorize. The datafiles can then be transferred to the DCD-R for storage a5), utilizing 'write' capability of burner of the computer processor device. In a5) the datafiles are delivered to the consumer/user at a remote location. Likewise, in b7) and 2b5 of FIG. 2. A simplification of the process becomes evident when the datafile download methods are compared.

The preferred embodiment as described above, will utilize the dCD-R in a manner similar to technology used in debit and/or prepaid calling cards. Incorporating qualities allowing a vast number of disposable cards to be dispensed. Each disposable card may authorize an application a predetermined amount of times. The applications are of various types. However, in the calling card application, each card with its assigned number provides a consumer a predetermined amount of telephone calling minutes, especially long distance calling. The card may be discarded upon exhaustion of the allotted minutes.

In the preferred embodiment dCD-R optical disc, dedicated storage mediums, are expendable in a manner similar to the calling card example. However, the expendable quality is in regard to the download authorizations per each dCD-R. Unlike the disposable calling card, dCD-R's retain storage and 'replay' properties upon exhaustion of the download authorizations allotted. Dedicated storage medium refers to the dCD-R's being designated to authorize access to datafile downloads. 'Dedicated' does not refer to storage and replay characteristics of the dCD-R optical disc, in this embodiment.

Website-K is constructed as a client/server system. The client application is employed at the user/consumer location. The client/server communication is supported by facilities for interprocess both within and between client and server CPU's. Client and Server(s) together allow for distributed computation and presentation of results. Website-K utilizes http.

As will be further appreciated by those of skill in the art, while described above primarily with reference to method aspects, the present invention may be embodied as methods, apparatus/systems and/or computer program products.

CONCLUSION, RAMIFICATIONS, AND SCOPE OF THE INVENTION

Thus the reader will see that the proprietary download system of the present invention provides paying consumers a versatile choice of payment methods. The point of sale enables extension of the availability of proprietary download service to a wider consumer base. Including consumers unable or not wanting to utilize credit cards to make transactions over the Internet. The point of sale enables the sale of datafile downloads at brick and mortar retail stores. Also, access to legal datafile downloads is conveniently integrated with a removable storage medium.

While the above description contains many specifities, these should not be construed as limitations on the scope of the invention, but rather as an exemplification of one preferred embodiment thereof. Many other variations are possible. For example, when the dCD-R authorizes a predetermined amount of datafile downloads from Website-K, from the server to client, rather than transferring the datafiles to the dCD-R for storage, an alternative storage medium and/or device may be selected by the consumer, enabled by the validated dCD-R.

In an additional embodiment, the dCD-R incorporates a visible serial number. Whereby facilitating human input of the serial number for evaluation by Website-K. Furthermore, the dCD-R nay incorporate various security measures to validate authorization of access to datafile downloads. Including manufacture ing and/or encoding incorporated in a dCD-R application, which provide verification that the dCD-R is valid, and/or authorizes access to download of datafiles.

In yet another embodiment, the datafiles available via Website-K may originate solely from proprietary sources. There are various methods of conducting sales and distributing revenues generated from proprietary operations. One method, subject to negotiation, would allow the owner's of the copyrighted material to receive the revenue from the sale of the dCD-R's, designed to allow x amount of downloads from the Website-K. At y amount of actual downloads the owner's of the copyrighted (and/or proprietary) material are attributed a charge from Website-K, y being greater than x.

This invention as described above, may utilize existing technology, and/or that yet to be invented to achieve the objective of it's embodiments. The invention while described in terms of communications utilizing typical web interfaces such as hypertext transfer protocol (http), the invention does not rely on any particular platorm or interface. The invention can use webtype browser software or software that has been developed specifically for the purposes of the present invention with unique code, interfaces and display technologies. In the drawings and specification, there have been disclosed typical illustrative embodiments of the invention and, although specific terms are employed, they are used in a generic and descriptive sense only and not for the purposes of limitation, the scope of invention being set forth in the following claims.

We claim:

1. A method of datafile transfer comprising:
   providing a storage means for storing data on a designated and exclusive storage medium, in a multitude;
   providing access to an archive of datafiles via a communication means, utilizing a computer processor means for processing data;
   said communication means includes validation and reconciliation means of the storage mediums;
   providing remote access means to personalized selection of datafiles in the archive from a plurality of locations;
   further including the following steps;
   1) obtaining said storage medium,
   2) employing remote access via communication means to the archive of datafiles,
   3) selecting desired file(s) from the datafiles in the archive,
   4) employing validation and reconciliation means on the storage medium,
   5) allowing download of datafile(s) for storage on valid storage medium,
   whereby obtaining the storage medium will provide authorized access to a predetermined amount of datafile downloads from the archive to a remote location via remote access means for storage on the storage medium, downloading of datafile(s) are disallowed in absence of valid storage medium per use of the validation and reconciliation means, utilizing computer processor means for processing data to enable steps 2-5.

2. The method of claim 1, wherein the storage means for storing data utilized are optical disc storage mediums, said method further including authoring means for transferring data to optical disc storage mediums.

3. The method of claim 1, wherein the communication means providing access to the archive of datafiles, is a website which facilitates personal selection of datafiles.

4. The method of claim 1, wherein the remote access means utilized is a World Wide Web Connection to said communication means.

5. The method of claim 2, wherein the validation and reconciliation means utilized is serialization of said multitude of storage mediums, and accounting of datafile(s) downloaded, for storage on the optical discs.

6. The method of claim 5, wherein said validation and reconciliation means is used to limit the predetermined amount of datafile(s) authorized for download.

7. The method of claim 6, wherein each of said multitude of optical disc storage mediums incorporate means for encoding, such that provide designated and exclusive datafile downloads in a predetermined amount, of datafiles from said archive of datafiles to the optical disc storage medium for storage, whereby incorporating means for validating authorization remotely.

8. A method of datafile downloading comprising:
providing CD-R's in a multitude, incorporating encoding means such that provide designated and exclusive access to datafile downloads, in a predetermined amount per each CD-R, for storage on said CD-R;
providing a website that facilitates access to an archive of files, and personalized selection of said files;
said website will include a validation and reconciliation means of said multitude of CD-R's;
providing remote access via World Wide Web connection to the website, utilizing a computer processing means for processing data;
further including the following steps:
1) obtaining said CD-R,
2) employing remote access via World Wide Web connection to said website,
3) selecting desired files from the datafiles in the archive,
4) employing validation and reconciliation means on the CD-R,
5) allowing download of datafile(s) for storage on the CD-R, upon validation of CD-R authorization,
whereby obtaining the CD-R will provide authorized access to a predetermined amount of datafile transfers from the archive of said website to a remote location via remote access of World Wide Web connection for storage on the CD-R storage medium, transfer of file(s) are disallowed in absence of valid CD-R storage medium per use of the validation and reconciliation means, utilizing computer processor means for processing data to enable steps 2-5.

9. The method of claim 8, wherein under proprietary employment, the point of sale of access to datafile downloads occurs at obtaining said CD-R storage medium.

10. The method of claim 9, wherein access to datafile downloads is limited to a predetermined amount, by said validation and reconciliation means.

11. The method of claim 10, further including providing the option of electing alternative datafile storage means, for the predetermined amount of datafile downloads is enabled by the validated CD-R storage medium, which has been subjected to the validation and reconciliation means.

12. The method of claim 11, wherein the validation and reconciliation means utilized is serialization of the multitude of CD-R storage mediums, and accounting of datafile(s) downloaded, for storage on the CD-R or to elected alternative datafile storage means.

13. The method of claim 12, wherein the website incorporates the validation and reconciliation means of the CD-R storage medium(s), occurring remotely via World Wide Web data transmission.

14. The method of claim 13, further including a multitude of DVD-R's as an additional designated and exclusive storage means for storing data in substantially the same application of the CD-R's, in simultaneous employment.

15. A downloading website apparatus comprising:
a multitude of optical disc data storage mediums, each of which incorporating encoding means such that provides designated and exclusive downloads of datafiles in a predetermined amount for storage on the optical disc;
a website providing remote access to an archive of datafiles and facilitating personal selection of datafiles in said archive, also including a means for validation and reconciliation of each of said optical disc data storage mediums, prior to allowing download of datafiles for storage on the optical disc;
said website further including, providing the option of electing alternative data storage means, for the predetermined amount of datafile downloads is enabled by validating the optical disc storage medium, by subjection to the validation and reconciliation means;
further including the following steps;
1) obtaining said storage medium,
2) employing remote access via communication means to the archive of
3) selecting desired file(s) from the datafiles in the archive,
4) employing validation and reconciliation means on the storage medium,
5) allowing download of datafile(s) for storage on valid storage medium,
whereby obtaining the optical disc storage medium will provide authorization of access to a predetermined amount of datafile downloads from the archive of said website to a remote location via remote access of World Wide Web connection, for storage on the optical disc storage medium, or elected alternative data storage means, downloading of datafile(s) are disallowed in absence of a validated optical disc storage medium per use of validation and reconciliation means.

16. The apparatus of claim 15, wherein the datafiles contain music files.

17. The apparatus of claim 16, wherein the datafiles contain movie (motion picture)/video files.

18. The apparatus of claim 17, further including the following process for proprietary operation:
1) offering for sale to consumers, the optical disc storage mediums, which provide access to x amount of datafile downloads from the website to the optical disc for storage, or elected alternative data storage means,
2) offering for sale to copyright holders, distribution of proprietary material via y amount of actual downloads from the website, whereby, copyright holders receive the revenue from the sale of the designated optical disc storage mediums, designed to allow x amount of datafile downloads from the website to the consumer, at y amount of actual datafile downloads of the proprietary material, the copyright holder will be charged a fee, allowance and costs subjection to negotiation, y being greater than x.

19. The apparatus of claim 18, further including an encoding means incorporating a visible serial number, facilitating human input of the serial number for subjection to the validation and reconciliation means.

* * * * *